US012793400B2

(12) United States Patent
Takakuwa et al.

(10) Patent No.: US 12,793,400 B2
(45) Date of Patent: Nov. 10, 2026

(54) IMAGE PROCESSING ALGORITHM EVALUATING APPARATUS

(71) Applicants: MITSUBISHI HEAVY INDUSTRIES MACHINERY SYSTEMS, LTD., Hyogo (JP); THE UNIVERSITY OF TOKYO, Tokyo (JP)

(72) Inventors: Yoshinao Takakuwa, Hyogo (JP); Kunio Takahashi, Hyogo (JP); Masato Iehara, Tokyo (JP); Shunsuke Kamijo, Tokyo (JP); Daiki Shiotsuka, Tokyo (JP); Ehsan Javanmardi, Tokyo (JP)

(73) Assignees: MITSUBISHI HEAVY INDUSTRIES MACHINERY SYSTEMS, LTD., Kobe (JP); THE UNIVERSITY OF TOKYO, Tokyo (JP)

( * ) Notice: Subject to any disclaimer, the term of this patent is extended or adjusted under 35 U.S.C. 154(b) by 249 days.

(21) Appl. No.: 18/562,285

(22) PCT Filed: May 18, 2022

(86) PCT No.: PCT/JP2022/020645
§ 371 (c)(1),
(2) Date: Nov. 17, 2023

(87) PCT Pub. No.: WO2022/244800
PCT Pub. Date: Nov. 24, 2022

(65) Prior Publication Data

US 2025/0086947 A1 Mar. 13, 2025

(30) Foreign Application Priority Data

May 18, 2021 (JP) ................................ 2021-083932

(51) Int. Cl.
*G06V 10/776* (2022.01)
*G06V 10/774* (2022.01)
*G06V 20/56* (2022.01)

(52) U.S. Cl.
CPC .......... *G06V 10/776* (2022.01); *G06V 10/774* (2022.01); *G06V 20/56* (2022.01)

(58) Field of Classification Search
CPC .... G06T 11/00; G06V 10/774; G06V 10/776; G06V 10/82; G06V 20/56
See application file for complete search history.

(56) References Cited

U.S. PATENT DOCUMENTS 10,762,650 B1 9/2020 Guo et al.
2019/0205667 A1 7/2019 Avidan et al.
(Continued)

FOREIGN PATENT DOCUMENTS

JP 2008194770 A 8/2008

OTHER PUBLICATIONS

Tremblay, M., Halder, S.S., de Charette, R. et al. Rain Rendering for Evaluating and Improving Robustness to Bad Weather. Int J Comput Vis 129, 341-360 (2020). https://doi.org/10.1007/s11263-020-01366-3 (Year: 2020).*
(Continued)

*Primary Examiner* — Michael J Vanchy, Jr.
(74) *Attorney, Agent, or Firm* — HAUPTMAN HAM, LLP

(57) ABSTRACT

An image processing algorithm evaluating apparatus includes: an image storage unit that stores a plurality of actual images captured from a vehicle; an image generating unit that acquires a target image, when receiving disturbance information representing a disturbance in the target image from among the plurality of actual images stored in the image storage unit, interprets the target image, and generates
(Continued)

a composite image by manipulating the target image in such a manner that the disturbance is reflected to the target image based on the interpretation; and an image processing unit that evaluates performance of an image processing algorithm for determining a situation around the vehicle based on the generated composite image.

5 Claims, 8 Drawing Sheets

(56) References Cited

U.S. PATENT DOCUMENTS

| | | | | |
|---|---|---|---|---|
| 2019/0220029 | A1* | 7/2019 | Fukuhara | G06N 3/09 |
| 2021/0004608 | A1* | 1/2021 | Jaipuria | G06T 15/06 |
| 2022/0189145 | A1* | 6/2022 | Evans | G06V 10/82 |

OTHER PUBLICATIONS

"Extended European Search Report for European Application No. 22804711.4" Jul. 22, 2024, 8 pp.
Daiki Shiotsuka et al., "GAN-Based Semantic-Aware Translation for Day-to-Night Images" 2022 IEEE International Conference on Consumer Electronics (ICCE), Jan. 7, 2022, 6 pp.
Maxime Tremblay et al., "Rain rendering for evaluating and improving robustness to bad weather", arxiv.org, Cornell University Library, Sep. 6, 2020, 19 pp.
International Search Report and Written Opinion of the ISA of International Application No. PCT/JP2022/020645 mailed Aug. 9, 2022; 10pp.

* cited by examiner

IMAGE PROCESSING ALGORITHM EVALUATING APPARATUS

RELATED APPLICATIONS

The present application is a National Phase of International Application Number PCT/JP2022/020645 filed May 18, 2022 and claims priority of Japanese Application Number 2021-083932 filed May 18, 2021.

FIELD

The present disclosure relates to an image processing algorithm evaluating apparatus.

BACKGROUND

Vehicles with driving aiding functions such as autonomous driving are currently under development. Provided onboard a vehicle with such a driving aiding function is an image processing algorithm for capturing an image of the environment around the vehicle using an onboard camera or the like, and determining a situation around the vehicle based on the captured image thus captured.

In order to implement appropriate driving aiding functions, such an image processing algorithms are subjected to various types of performance evaluation. For example, there is a known technology for evaluating the performance of an image processing algorithm by causing the image processing algorithm to apply image processing on a composite image resultant of superimposing a weather disturbance image created by computer graphics, over an actual image captured from the vehicle (see Patent Literature 1, for example).

CITATION LIST

Patent Literature

Patent Literature 1: Japanese Patent Application Laid-open No. 2008-194770

SUMMARY

Technical Problem

However, images such as a weather disturbance image generated in the technology disclosed in Patent Literature 1 does not reflect the situation such as objects captured in the actual image. Therefore, if an image processing algorithm is evaluated using such a composite image, the evaluation may end up being inappropriate.

The present disclosure is made in consideration of the above, and an object of the present disclosure is to provide an image processing algorithm evaluating apparatus capable of evaluating the performance of an image processing algorithm for determining a situation around a vehicle, appropriately.

Solution to Problem

An image processing algorithm evaluating apparatus according to the present disclosure includes: an image storage unit that stores actual images captured from a vehicle; an image generating unit that acquires a target image, when receiving disturbance information representing a disturbance in the target image from among the actual images stored in the image storage unit, interprets the target image, and generates a composite image by manipulating the target image in such a manner that the disturbance is reflected to the target image, based on the interpretation; and an image processing unit that evaluates performance of an image processing algorithm for determining a situation around the vehicle based on the generated composite image.

Advantageous Effects of Invention

According to the present disclosure, it is possible to evaluate the performance of an image processing algorithm for determining a situation around a vehicle, appropriately.

DESCRIPTION OF EMBODIMENTS

Some embodiments of an image processing algorithm evaluating apparatus according to the present disclosure will now be explained with reference to the drawings. These embodiments are, however, not intended to limit the scope of the present invention. The elements disclosed in the embodiments described below include those that are replaceable and easily replaceable, or those that are substantially identical.

First Embodiment

Figure 1:
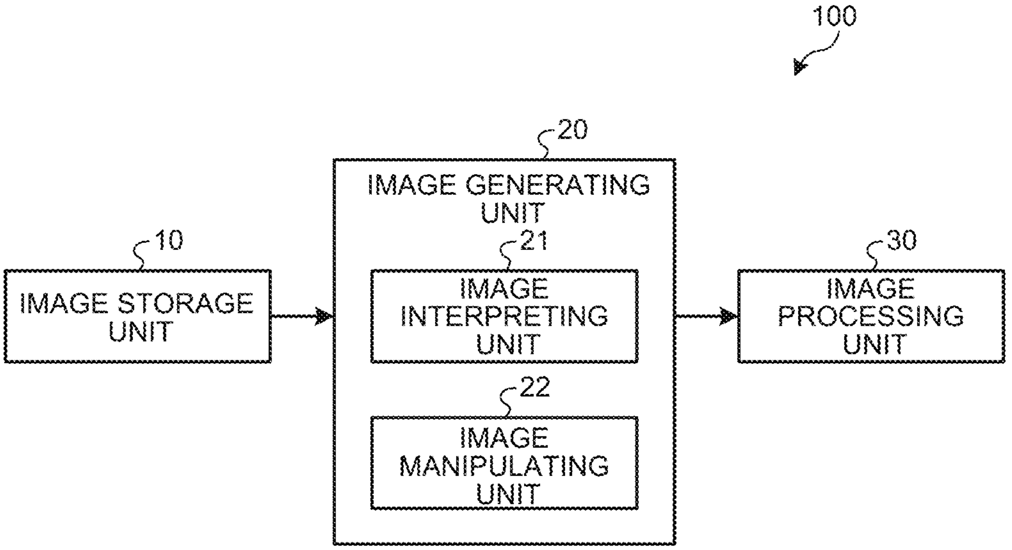
FIG. 1 is a functional block diagram illustrating an example of an image processing algorithm evaluating apparatus according to the first embodiment.

FIG. 1 is a functional block diagram illustrating an example of an image processing algorithm evaluating apparatus according to a first embodiment. An image processing algorithm evaluating apparatus 100 illustrated in FIG. 1 includes a processor that is a central processing unit (CPU), and a storage that is a memory storing therein an operation content or information of a computer program. The memory includes at least one of a random access memory (RAM), a read-only memory (ROM), and an external storage such as a hard disk drive (HDD), for example. As illustrated in FIG. 1, the image processing algorithm evaluating apparatus 100 includes an image storage unit 10, an image generating unit 20, and an image processing unit 30.

The image storage unit 10 stores therein actual images captured from the vehicle. Examples of actual images includes a front image resultant of capturing an image ahead of the vehicle, a side image resultant of capturing an image from a side of the vehicle, and a rear image resultant of capturing an image behind the vehicle. Examples of actual images also includes an actual image captured in clear weather, an actual image captured in rainy weather, an actual image captured in daytime, and an actual image captured in nighttime, for example.

The image generating unit 20 generates a composite image by combining a disturbance that is based on disturbance information received from an input unit not illustrated, for example, with a target image received from the image storage unit 10. The image generating unit 20 includes an image interpreting unit 21 and an image manipulating unit 22. The image interpreting unit 21 interprets an image stored in the image storage unit 10. The image manipulating unit 22 manipulates a target image input to the image generating unit 20.

The image processing unit 30 evaluates the performance of an image processing algorithm performing image processing based on the generated composite image, and determining the situation around the vehicle. The image processing unit 30 applies image processing to the composite image using the image processing algorithm, and calculates determination information for determining the situation around the vehicle. The image processing unit 30 stores the calculated determination information in a storage unit, not illustrated, for example. An example of the determination information includes an approaching and crossing time that is the time for a traveling vehicle to move from the position at which the image is captured to a position where there is an object ahead of the vehicle. The image processing unit 30 can evaluate the performance of the image processing algorithm based on whether there is any large difference between the determination information resultant of processing an image without any disturbance, and determination information resultant of processing the image with a disturbance.

Figure 2:
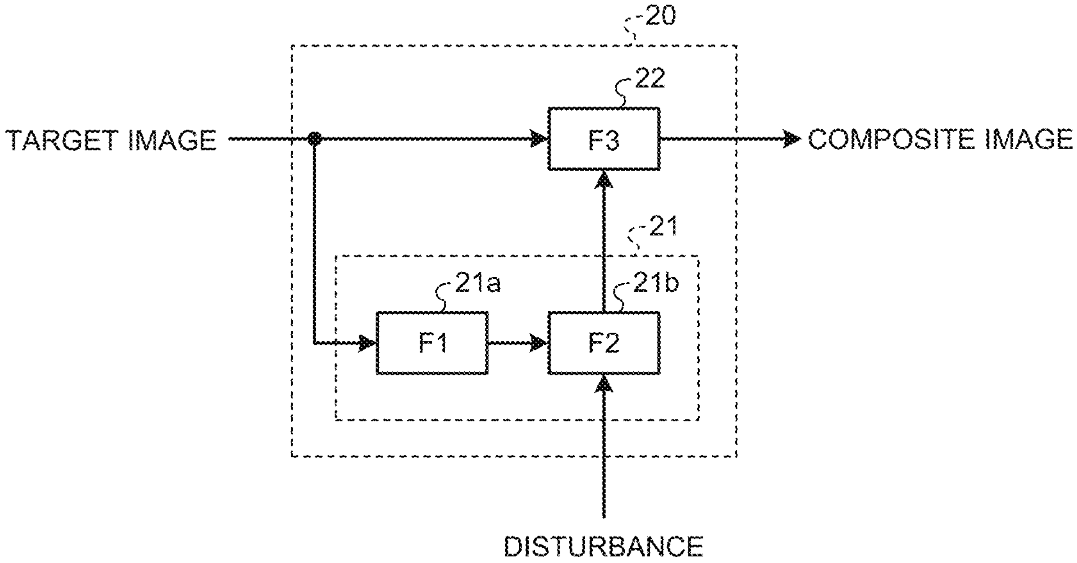
FIG. 2 is a schematic illustrating an example of a process performed in an image generating unit.

FIG. 2 is a schematic illustrating an example of a process performed in the image generating unit 20. As illustrated in FIG. 2, the image generating unit 20 receives a target image and disturbance information. An example of a target image includes an actual image ahead of the vehicle, captured by the vehicle. An example of disturbance information includes a weather condition such as fog. In the present embodiment, an example of the disturbance being fog will be explained.

The image interpreting unit 21 includes operating units 21*a*, 21*b*. The operating unit 21*a* acquires the input target image. The operating unit 21*a* performs image processing to estimate a distance from the position at which the target image is captured to the object included in the target image, for each pixel. When the object included in the target image is the sky, the distance can be estimated as infinity (indicating the sky). The operating unit 21*a* then generates distance information in which the estimated distance is associated with the corresponding pixel, and output the distance information.

The operating unit 21*b* acquires the distance information output from the operating unit 21*a*. The operating unit 21*b* also acquires disturbance information entered via an input unit, not illustrated. An example of the disturbance information includes a fog image generated by computer graphics, for example. This image may be an image having the same resolution as that of the target image (actual image), for example.

The operating unit 21*b* calculates the intensity of disturbance corresponding to each pixel, based on the distance information. For example, in an environment in which fog appears, an object is affected more by the fog when the object is farther away from the position at which the image is captured. Therefore, by adjusting the intensity of disturbance for each pixel based on the distance included in the distance information, it is possible to adjust the disturbance to that close to the actual environment. After making the adjustment of the disturbance for each pixel, the operating unit 21*b* outputs the disturbance information having the disturbance adjusted.

The image manipulating unit 22 acquires the input target image. The image manipulating unit 22 also acquires the disturbance information output from the operating unit 21*b*. The image manipulating unit 22 generates a composite image by superimposing the disturbance included in the acquired disturbance information over each pixel of the target image. In other words, the disturbance information input to the image manipulating unit 22 is information resultant of adjusting, based on the distance, the intensity of the disturbance in each pixel of the disturbance information input from the input unit, not illustrated. By superimposing the adjusted disturbance over the target image, an appropriate composite image that is closer to the actual disturbance environment can be generated.

Based on the composite image, the image processing unit 30 evaluates the performance of an image processing algorithm for determining the situation around the vehicle. Because the performance of an image processing algorithm is evaluated based on an appropriate composite image that is closer to the actual surrounding environment, an appropriate evaluation result can be achieved, compared with when superimposed is disturbance generated simply by computer graphics. Furthermore, compared with a configuration in which a simulator is used to reproduce the actual surrounding environment three dimensionally in detail to determine the situation around the vehicle, it is possible to achieve an appropriate evaluation result without using a large complex system.

Figure 3:
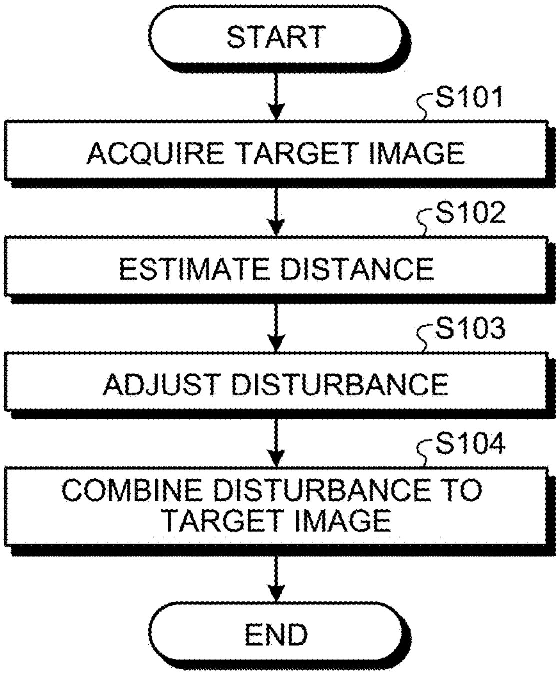
FIG. 3 is a flowchart illustrating the sequence of a process of generating an image.

FIG. 3 is a flowchart illustrating the sequence of the process of generating an image. As illustrated in FIG. 3, the image generating unit 20 causes the image interpreting unit 21 to acquire the input target image (Step S101). The image interpreting unit 21 estimates the distance from the position at which the target image is captured to an object corresponding to the pixels included in the target image (Step S102), and adjusts the disturbance by calculating the intensity of the disturbance resultant of being subjected to the estimated distance (Step S103). Based on the input target image and the disturbance intensity calculated in the operating unit 21*b*, the image manipulating unit 22 generates a composite image by combining the attenuated disturbance to the target image (Step S104).

In the manner described above, the image processing algorithm evaluating apparatus 100 according to the present embodiment includes: the image storage unit 10 that stores therein a plurality of actual images captured from a vehicle; the image generating unit 20 that acquires a target image, when receiving disturbance information representing a disturbance in the target image, from among the plurality of actual images stored in the image storage unit 10, interprets the target image, and generates a composite image by manipulating the target image in such a manner that the disturbance is reflected to the target image based on the interpretation; and the image processing unit 30 that evaluates the performance of an image processing algorithm for determining the situation around the vehicle based on the generated composite image.

With this configuration, because a composite image is generated by manipulating the target image in such a manner that disturbance is reflected to the target image, based on the result of the interpretation of the target image, made by the image generating unit 20, a composite image close to the actual surrounding environment can be generated, compared with when superimposed is disturbance generated merely by computer graphics, for example. In this manner, it is possible to evaluate the performance of an image processing algorithm for determining the situation around the vehicle, appropriately.

Furthermore, in the image processing algorithm evaluating apparatus 100 according to the present embodiment, the image generating unit 20 estimates a distance from a position at which the target image is captured to an object included in the target image, calculate an intensity of disturbance resultant of being subjected to the estimated distance, and generates the composite image based on the calculation result. Therefore, a composite image even closer to the actual surrounding environment can be generated.

Second Embodiment

Figure 4:
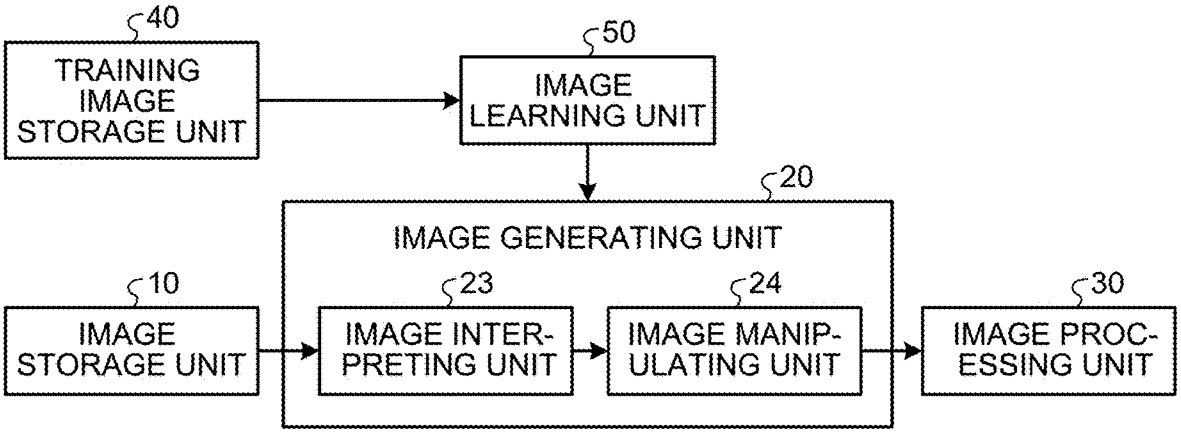
FIG. 4 is a functional block diagram illustrating an example of an image processing algorithm evaluating apparatus according to a second embodiment.

A second embodiment will now be explained. FIG. 4 is a functional block diagram illustrating an example of an image processing algorithm evaluating apparatus according to the second embodiment. The image processing algorithm evaluating apparatus 100 according to the second embodiment has a configuration including the image storage unit 10, the image generating unit 20, and the image processing unit 30, in the same manner as that according to the first embodiment. In the present embodiment, however, the processing performed by the image generating unit 20 is different from that according to the first embodiment. A training image storage unit 40 and an image learning unit 50 are also additionally provided.

In the present embodiment, the training image storage unit 40 stores therein a reference image that is an actual image not including any disturbance, and a disturbance image that is an actual image including disturbance, as training images. An example of the reference image includes an actual image captured under a condition resulting in a least disturbance, e.g., during the daytime under clear weather. An example of the disturbance image includes an actual image captured under a condition where a larger amount of disturbance than that in the reference image is introduced, e.g., at the time of rain or snow, with fog, at the time of dawn, in the evening, or during the nighttime. The training image storage unit 40 may store therein a reference image and a disturbance image of the same subject or corresponding subjects, in a manner associated with each other. For example, the training image storage unit 40 may store therein a reference image of a predetermined location captured during the daytime under clear weather, and a disturbance image of the predetermined location captured at the time of rain or snow, with fog, at the time of dawn, in the evening, or during the nighttime, in a manner associated with each other.

Figure 5:
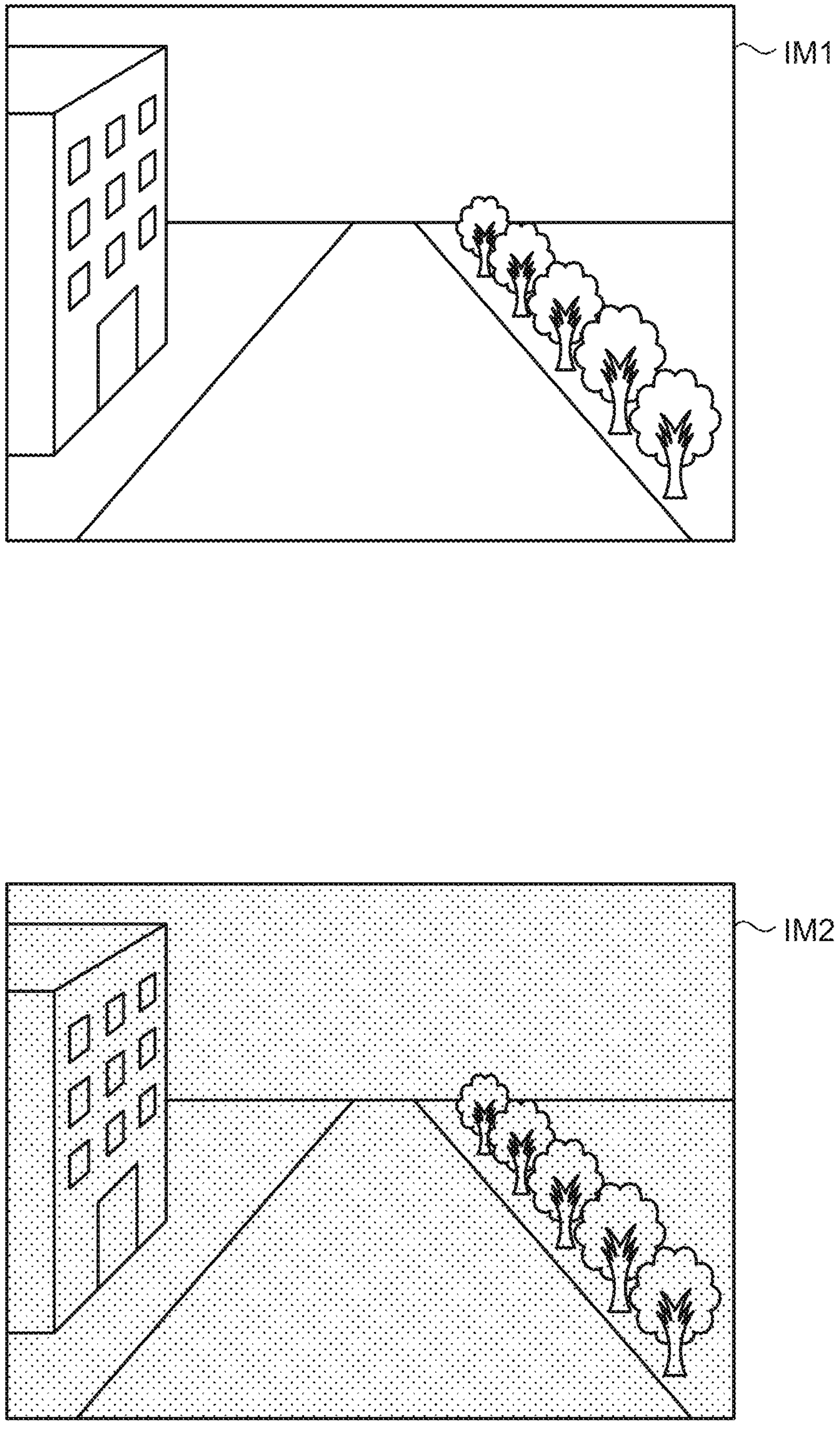
FIG. 5 is a schematic illustrating an example of a reference image and a disturbance image stored in an image storage unit according to the second embodiment.

FIG. 5 is a schematic illustrating an example of a reference image and a disturbance image stored in the training image storage unit 40 according to the second embodiment. A reference image IM1 illustrated in FIG. 5 is an actual image ahead of a traveling vehicle captured during the daytime under clear weather. A disturbance image IM2 illustrated in FIG. 5 is an actual image ahead of a traveling vehicle captured during the nighttime under clear weather, at the same location as that at which the reference image IM1 is captured. The reference image IM1 and the disturbance image IM2 are stored in the training image storage unit 40 in a manner associated with each other.

In the present embodiment, the image learning unit 50 can generate, when receiving a target image and disturbance information representing the disturbance in the target image, a training composite image, through learning with a neural network, for example. As a method for implementing predetermined image manipulation using a neural network in the image learning unit 50, a technology referred to as a generative adversarial network (GAN) or a technology referred to as a cycle GAN may be used, for example.

Figure 6:
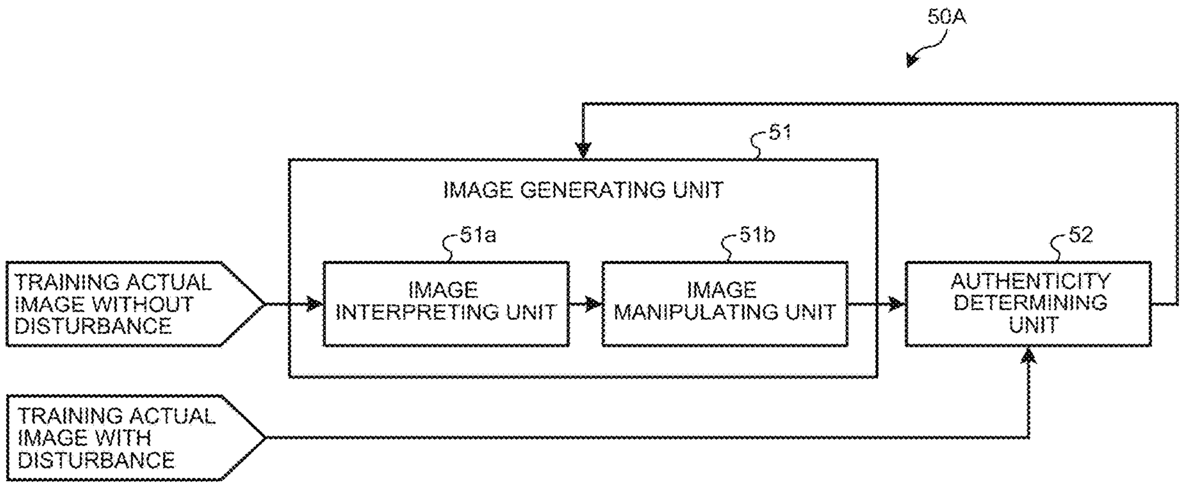
FIG. 6 is a conceptual schematic illustrating an example of an image learning unit.

FIG. 6 is a conceptual schematic illustrating an example of the image learning unit 50 (image learning unit 50A). As illustrated in FIG. 6, a generative adversarial network used in the image learning unit 50A includes two neural networks that are an image generating unit 51 and an authenticity determining unit 52. The image generating unit 51 has the same configuration as the image generating unit 20, and includes an image interpreting unit 51*a* and an image manipulating unit 51*b*. The image generating unit 51 generates a training composite image by combining a disturbance to a reference image, using the same process as the process performed by the image generating unit 20 in generating a composite image based on a target image and disturbance information. The authenticity determining unit 52 determines the authenticity of the training composite image generated by the image generating unit 51, based on the training composite image generated by the image generating unit 51 and a disturbance image associated with the reference image. The image generating unit 51 generates such a training composite image determined to be closer to the authentic image by the authenticity determining unit 52. The authenticity determining unit 52 attempts to detect more differences from the generated training composite image, with respect to the authentic image. By proceeding the training by causing the two networks to compete with each other alternately, the image generating unit 51 is trained to become able to generate a training composite image that is closer to the authentic disturbance image.

Figure 7:
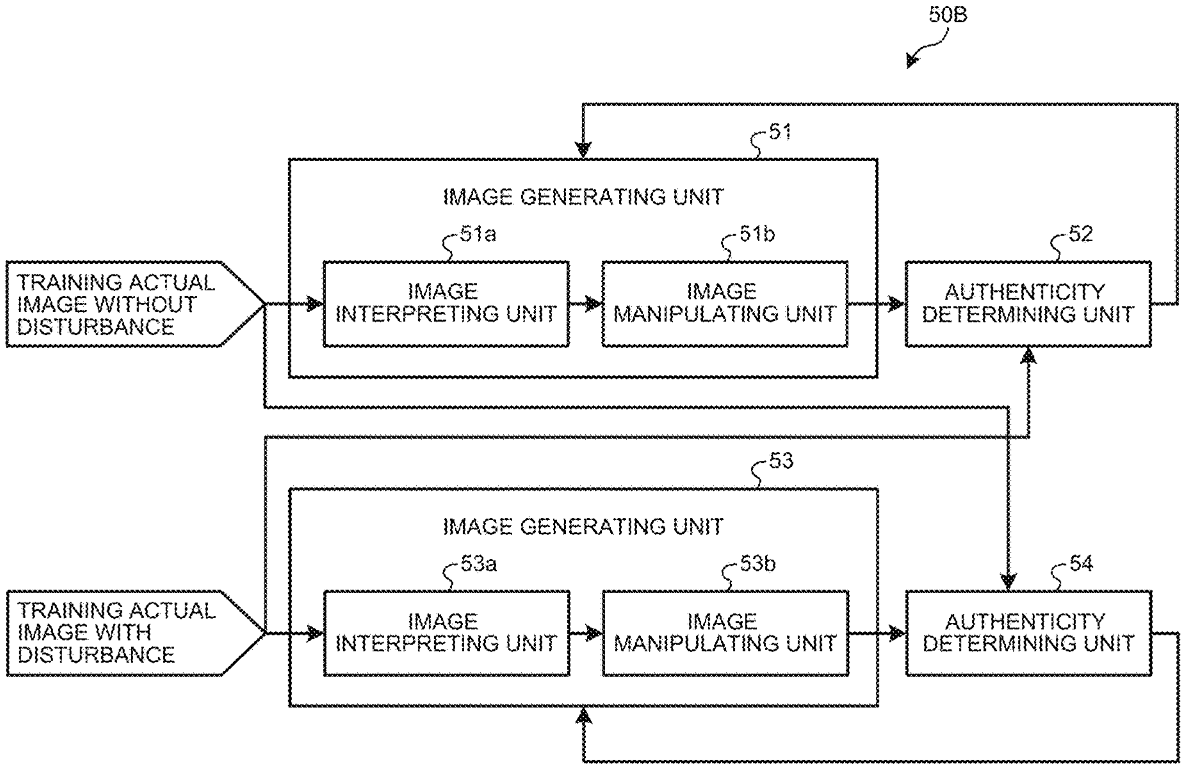
FIG. 7 is a conceptual schematic illustrating another example of the image learning unit.

FIG. 7 is a conceptual schematic illustrating another example the image learning unit 50 (image learning unit 50B). As illustrated in FIG. 7, the cycle generative adversarial network used in an image learning unit 50B includes the image generating units 51 and 53 and the authenticity determining units 52 and 54. The image generating units 51 and 53 have the same configurations as those of the image generating unit 20 described above. The image generating unit 51 includes the image interpreting unit 51*a* and the image manipulating unit 51*b*. The image generating unit 53 includes image interpreting units 53*a* and 53*b*. The image generating unit 51 generates a first training composite image by combining a disturbance to the reference image. The image generating unit 53 generates a second training composite image by removing the disturbance from the disturbance image. The authenticity determining unit 52 determines the authenticity of the first training composite image, based on the authentic disturbance image. The authenticity determining unit 54 determines the authenticity of the second training composite image based on the authentic reference image. The image generating units 51 and 53 generate such a first training composite image and a second training composite image that are determined to be closer to the authentic image by the authenticity determining units 52 and 54, that is, so that the determination accuracy is improved. The authenticity determining units 52 and 54 also attempt to detect more differences from the generated first training composite image and second training composite image, with respect to the respective authentic images. By proceeding the training by causing the two networks to compete with each other alternately, the image generating unit 51 is trained to become able to generate a training composite image closer to the authentic disturbance image, that is, to be result in an improved authenticity determination accuracy ratio.

In the cycle generative adversarial network, any reference image not including any disturbance and a disturbance image including disturbance may be used, and it is not necessary for the reference image and the disturbance image to be associated with each other. Therefore, compared with the generative adversarial network, training data can be collected easily.

Furthermore, when the cycle generative adversarial network is used, a plurality of disturbance images with different degrees of disturbance can be stored in the training image storage unit 40.

Figure 8:
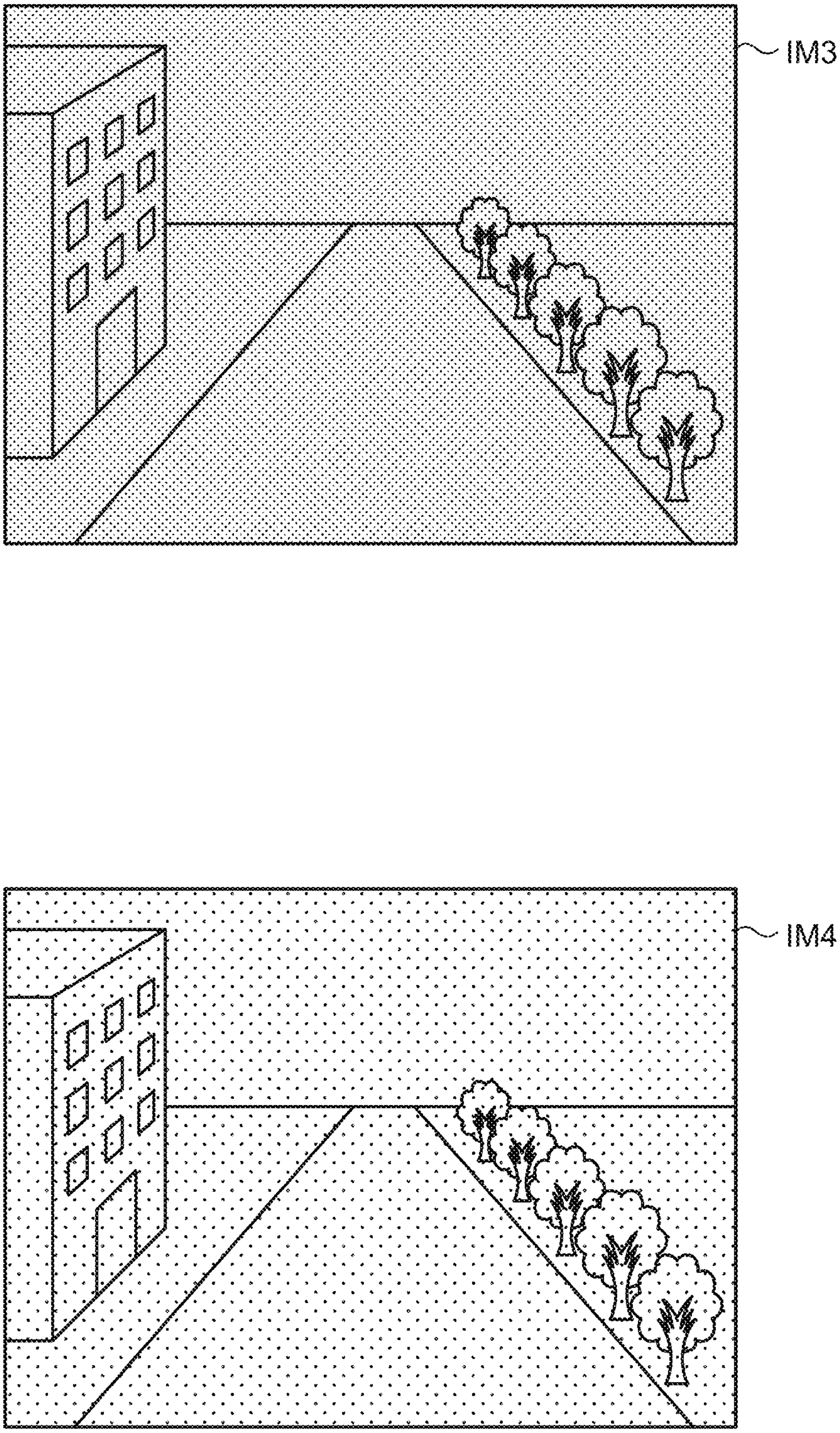
FIG. 8 is a schematic illustrating another example of a disturbance image stored in the image storage unit.

FIG. 8 is a schematic illustrating another example of the disturbance image stored in the training image storage unit 40. As illustrated in FIG. 8, the training image storage unit 40 stores therein disturbance images IM3 and IM4 with different degrees of the disturbance, from that in the disturbance image IM2, that is, in the nighttime with different brightness, in addition to the reference image IM1 and the disturbance image IM2 (see FIG. 5) described above. It is assumed herein that the brightness (degree of disturbance) of the disturbance image IM2 illustrated in FIG. 5 is 100 lux, for example; the brightness of the disturbance image IM3 illustrated in FIG. 8 is 10 lux, for example; and the brightness of the disturbance image IM4 is 1000 lux, for example.

By using the cycle generative adversarial network in a configuration in which a plurality of disturbance images with different degrees of disturbance are stored in the training image storage unit 40, when information designating a degree of disturbance (brightness) and information designating the type of disturbance (nighttime) are received as the disturbance information, for example, the image generating unit 20 can generate a composite image having a brightness corresponding to the designated brightness. In the example illustrated in FIG. 8, the image generating unit 20 can generate composite images having brightnesses 1000 lux, 100 lux, and 10 lux, for example.

Figure 9:
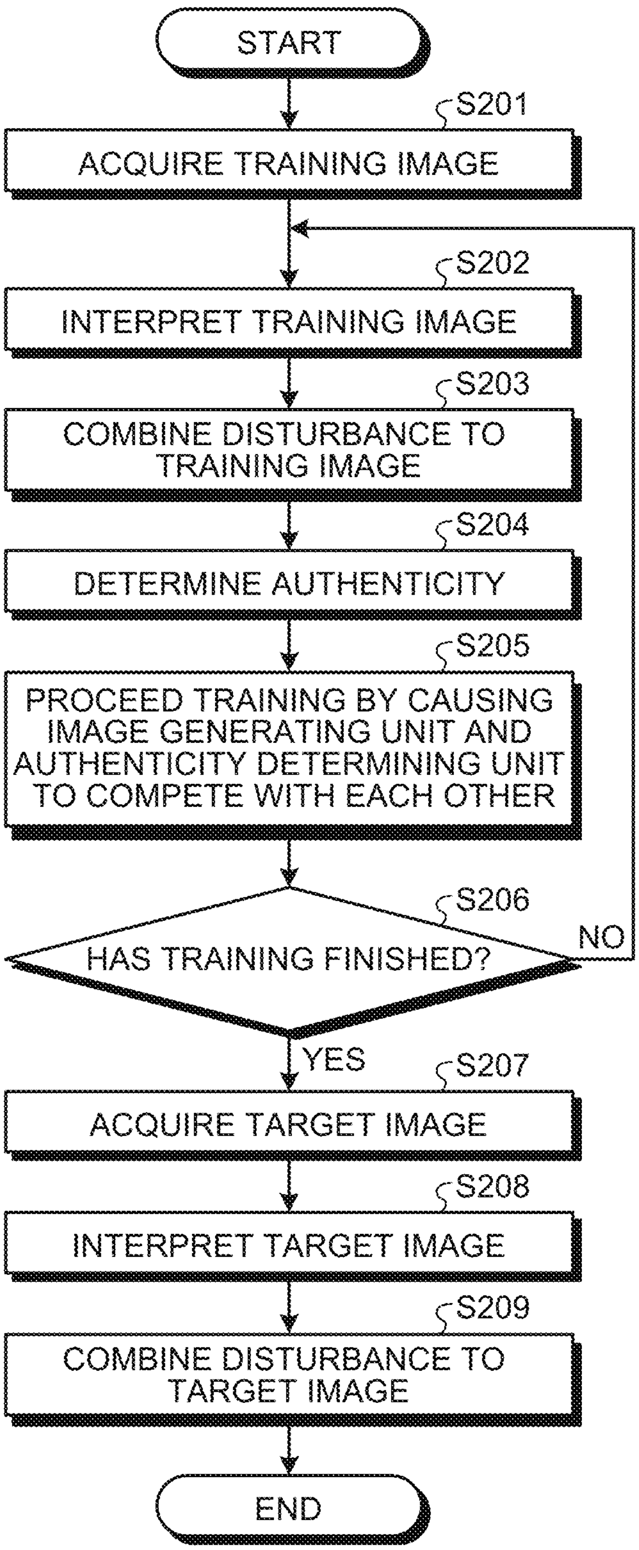
FIG. 9 is a flowchart illustrating the sequence of a process of generating an image.

FIG. 9 is a flowchart illustrating the sequence of the process of generating an image. As illustrated in FIG. 9, the image learning unit 50 acquires a training image stored in the training image storage unit 40 (Step S201). The image generating unit 51 causes the image interpreting unit 51*a* to interpret the acquired training image (Step S202). The image manipulating unit 51*b* generates a training composite image by adding the disturbance to the training image, based on the result of the interpretation (Step S203). The authenticity determining unit 52 determines the authenticity of the training composite image based on the authentic disturbance image (Step S204). The image learning unit 50 proceeds the training by causing the image generating unit 51 and the authenticity determining unit 52 to compete with each other alternately (Step S205). The image learning unit 50 determines whether the training has finished (Step S206), and if it is determined that the training has finished (Yes at Step S206), the process is shifted to Step S207. If it is determined that the training has not finished yet (No at Step S206), the process at Step S202 and thereafter is repeated. At Step S206, the image learning unit 50 can determine that the training has finished when the difference between the training composite image and the authentic disturbance image is equal to or less than a predetermined amount, that is, when the determination accuracy is equal to or higher than a predetermined level, for example.

After the training has finished, when receiving a target image and disturbance information, the image generating unit 20 acquires the target image from the image storage unit 10 (Step S207). The image interpreting unit 21 interprets the image based on the training result (Step S208). The image manipulating unit 22 generates a composite image that is the disturbance added to the target image, based on the result of the interpretation (Step S209).

As described above, in the image processing algorithm evaluating apparatus 100 according to the present embodiment, the training image storage unit 40 stores therein a reference image that is an actual image not including any disturbance and a disturbance image that is an actual image including a disturbance; the image learning unit 50 performs training using a generative adversarial network or a cycle generative adversarial network, based on the reference image and the disturbance image; and the image generating unit 20 interprets the target image based on the training result of the image learning unit 50, and generates a composite image.

In this configuration, the image learning unit 50 is trained with an actual image using a generative adversarial network or a cycle generative adversarial network, and the image generating unit 20 interprets the target image based on the training result and generates a composite image. Therefore, it is possible to generate a composite image closer to the actual surrounding environment. In this manner, it is possible to evaluate the performance of an image processing algorithm for determining the situation around the vehicle, appropriately.

Furthermore, the training image storage unit 40 stores therein a plurality of the disturbance images including the disturbance of a same type with different degrees; the image learning unit 50 carries out training based on the plurality of disturbance images including the disturbance with different degrees; and when receiving an input of the disturbance information including a degree of the disturbance, the image generating unit 20 interprets the target image based on the training result of the image learning unit 50, and generates the composite image in such a manner that the disturbance is reflected to the target image by a degree corresponding to the disturbance information. In this manner, because a composite image with a different degree of disturbance can be generated appropriately, a wide range of performance evaluation of an image processing algorithm can be performed.

Third Embodiment

A third embodiment will now be explained. The image processing algorithm evaluating apparatus 100 according to the third embodiment has a configuration including the image storage unit 10, the image generating unit 20, the image processing unit 30, the training image storage unit 40, and the image learning unit 50, in the same manner as that according to the second embodiment. In the present embodiment, the type of the actual image stored in the training image storage unit 40, and processing performed by the image generating unit 20 and the image learning unit 50 are different from those according to the second embodiment described above.

The training image storage unit 40 stores therein actual images including a reference image and a disturbance image as the training images, in the same manner as in the second embodiment. In the present embodiment, the training image storage unit 40 stores therein actual images with different attributes. Examples of the actual images with different attributes include a plurality of actual images with different attributes such as the location where the image is captured, e.g., an actual image captured in a shopping district, an actual image captured in a residential area, and an actual image captured on a mountain road. The training image storage unit 40 can store therein label information indicating the attribute, in a manner associated with such an actual image.

In the present embodiment, when a target image and disturbance information for the target image are received, the image generating unit 20 extracts label information indicating the above described attribute, from the target image. The image generating unit 20 is capable of interpreting the target image based on the training result of the image learning unit 50, which is to be described later, and generating a composite image reflecting the attribute. As one example, when the target image is a reference image of a "shopping district" during the daytime, and "nighttime" is input as disturbance information, conversions for not only darkening the sky but also turning on the illumination of nearby buildings may be performed. As another example, when the target image is a reference image of a "mountain road" during the daytime, and "nighttime" is input as disturbance information, conversions for not only darkening the sky but also darkening the entire surroundings may be performed.

Figure 10:
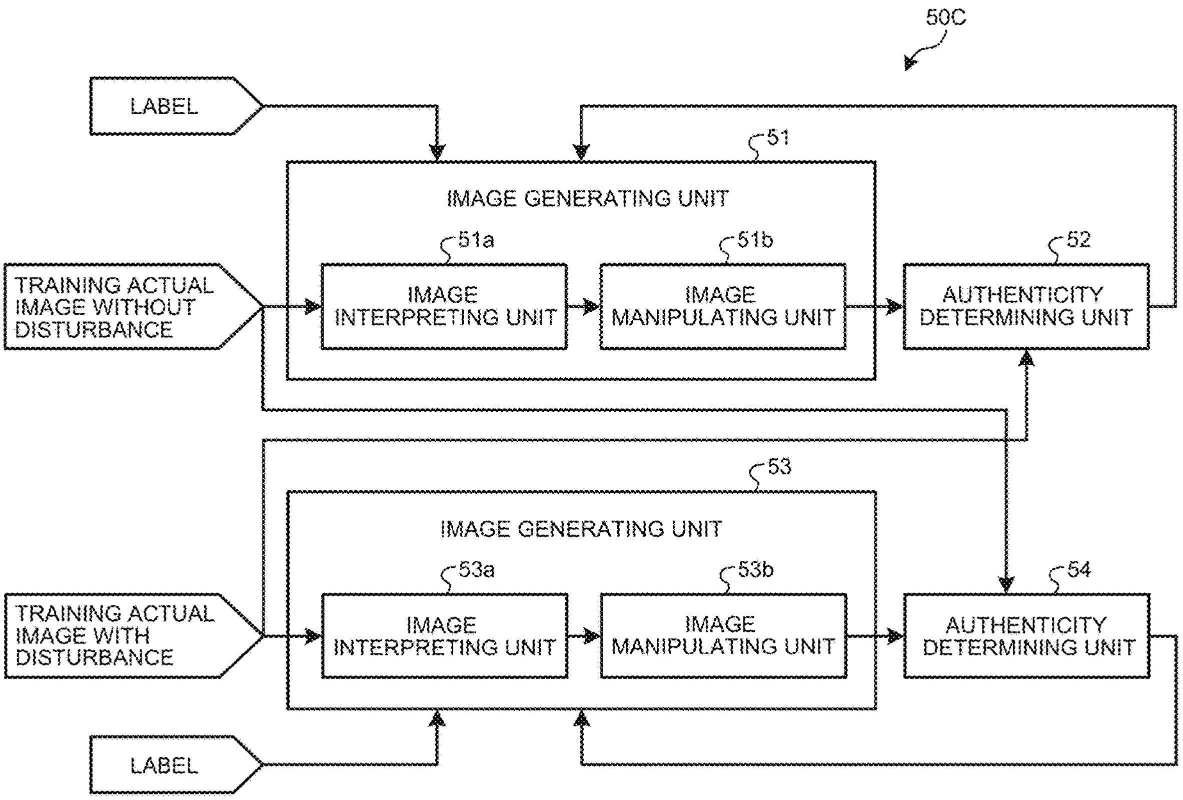
FIG. 10 is a conceptual schematic illustrating an example of an image learning unit according to a third embodiment.

FIG. 10 is a conceptual schematic illustrating an example of the image learning unit 50 (the image learning unit 50C) according to the third embodiment. As illustrated in FIG. 10, the cycle generative adversarial network used in the image learning unit 50C includes the image generating units 51 and 53 and the authenticity determining units 52 and 54, in the same manner as in the second embodiment. In the cycle generative adversarial network according to this embodiment, label information is input to the image generating units 51 and 53.

In this example, the image generating unit 51 generates a first composite image that is a reference image combined with disturbance. For example, when extracted is an attribute "shopping district", and input is the disturbance "nighttime", the image generating unit 51 generates a composite image in such a manner that the disturbance of nighttime is reflected to the reference image of the shopping district. The image generating unit 53 also generates a second composite image resultant of removing the disturbance of nighttime from the disturbance image during the nighttime in the shopping district. The authenticity determining unit 52 determines the authenticity of the first composite image based on the authentic disturbance image, and also determines whether the attribute "shopping district" is appropriately reflected to the first composite image. Furthermore, the authenticity determining unit 54 determines the authenticity of the second composite image based on the authentic reference image, and also determines whether the disturbance of the nighttime in the shopping district has been removed appropriately. In the manner described above, in the present embodiment, the authenticity determining units 52 and 54 make a determination on whether the attribute is reflected appropriately, in addition to the determination of the authenticity of the composite image.

In the present embodiment, the image generating units 51 and 53 generate a first composite image and a second composite image in such a manner that such composite images are determined by the authenticity determining units 52 and 54 as being closer to the authentic image and reflecting the attribute more appropriately. Furthermore, the authenticity determining units 52, 54 attempt to detect more differences with respect to the authentic image, and points where the attribute is not reflected appropriately, from the generated first composite image and second composite image. By proceeding the training by causing such two networks to compete with each other alternately, the image generating unit 51 is trained to become able to generate a composite image resulting in a higher determination accuracy ratio of the authenticity, as well as a higher determination accuracy ratio of the degree by which the attribute is reflected.

Figure 11:
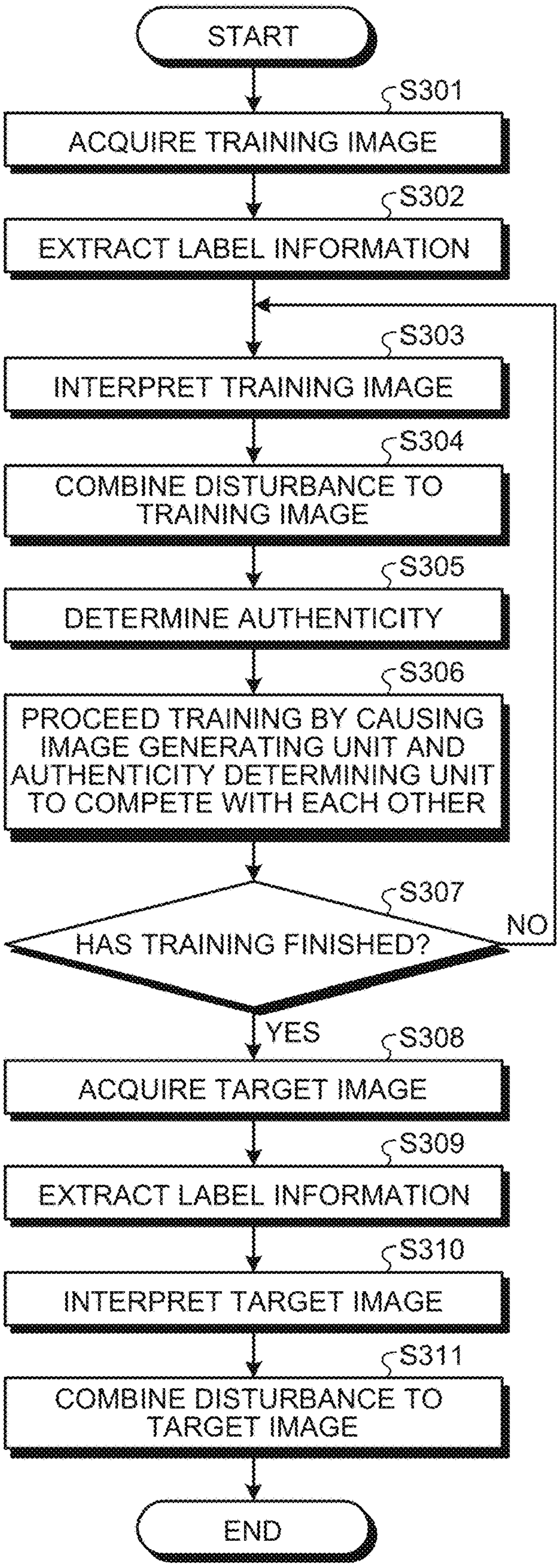
FIG. 11 is a flowchart illustrating the sequence of a process of generating an image.

FIG. 11 is a flowchart illustrating the sequence of the process of generating an image. As illustrated in FIG. 11, the image learning unit 50 acquires a training image stored in the training image storage unit 40 (Step S301). The image learning unit 50 extracts label information indicating an attribute included in the acquired training image (Step S302). The image generating unit 51 causes the image interpreting unit 51*a* to interpret the acquired training image (Step S303). The image manipulating unit 51*b* generates a training composite image by adding the disturbance to the training image, based on the result of the interpretation (Step S304). The authenticity determining unit 52 determines the authenticity of the training composite image based on the authentic disturbance image (Step S305). The image learning unit 50 proceeds the training by causing the image generating unit 51 and the authenticity determining unit 52 to compete with each other alternately (Step S306). The image learning unit 50 determines whether the training has finished (Step S307), and if it is determined that the training has finished (Yes at Step S307), the process is shifted to Step S308. If it is determined that the training has not finished yet (No at Step S307), the process at Step S303 and thereafter is repeated. At Step S307, for example, when the difference between the training composite image and the authentic disturbance image is equal to or less than a predetermined amount, and the difference between the training composite image and the disturbance image in the attribute-related part is equal to or less than a predetermined amount, that is, when the determination accuracy of the authenticity of the training composite image and the determination accuracy in the attribute-related part are equal to or higher than a predetermined level, the image learning unit 50 can determine that the training has finished.

When receiving a target image and disturbance information, the image generating unit 20 acquires the input target image (Step S308). The image interpreting unit 21 extracts the label information indicating the attribute included in the target image (Step S309), and interprets the target image (Step S310). The image manipulating unit 22 generates a composite image in which the disturbance is added to the target image, based on the result of the interpretation (Step S311).

As described above, in the image processing algorithm evaluating apparatus 100 according to the present embodiment, the training image storage unit 40 stores therein a plurality of the actual images including different attributes in a manner associated with label information indicating the attributes; the image learning unit 50 carries out training using the cycle generative adversarial network in such a manner that a determination accuracy related to the attributes between the generated training composite image and the disturbance image is improved; and when receiving the target image and the disturbance information, the image generating unit 20 extracts the label information indicating the attribute of the target image, interprets the target image based on the training result of the image learning unit 50, and generates the composite image reflecting the attribute.

With such a configuration, training can be carried out using a cycle generative adversarial network to improve the determination accuracy ratio of the authenticity of the training composite image, as well as the determination accuracy ratio of the degree by which the attribute is reflected. Therefore, it is possible to generate a composite image in a manner suitable for the attribute of the actual image.

The technical scope of the present invention is not limited to the embodiments described above, and the embodiments may be modified as appropriate, within the scope not deviating the gist of the present invention.

REFERENCE SIGNS LIST

IM1 Reference image
IM2, IM3, IM4 Disturbance image
10 Image storage unit
20 Image generating unit
21 Image interpreting unit
21*a*, 21*b* Operating unit
22 Image manipulating unit
30 Image processing unit
40 Training image storage unit
50 Image learning unit
51, 53 Image generating unit
51*a*, 53*a* Image interpreting unit
51*b*, 53*b* Image manipulating unit
52, 54 Authenticity determining unit
100 Image processing algorithm evaluating apparatus

The invention claimed is:

1. An image processing algorithm evaluating apparatus comprising:

a memory and a processor, wherein the memory is configured to store actual images captured from a vehicle; and the processor is configured to:

when receiving disturbance information representing a disturbance, acquire a target image from among the actual images stored in the memory, interprets the target image, and generates a composite image by manipulating the target image in such a manner that the disturbance is reflected to the target image, based on the interpretation;

evaluate performance of an image processing algorithm performing image processing based on the generated composite image and determining a situation around the vehicle;

apply image processing to the composite image using the image processing algorithm and calculate determination information for determining the situation around the vehicle, evaluate the performance of the image processing algorithm based on whether there is a difference between the determination information resultant of processing an image without disturbance, and the determining information resultant of processing the image with a disturbance, generate as training images a first training composite image by combining a disturbance to the reference image and a second training composite image by removing the disturbance from the disturbance image, determine the authenticity of the first training composite image, based on the authentic disturbance image, determining the authenticity of the second training composite image based on the actual image, and learning based on the evaluation results, and use the training results, generating the first training composite image and the second training composite image in a way that maximizes the accuracy rate, and use the first training composite image and the second training composite image as the composite image.

2. The image processing algorithm evaluating apparatus according to claim 1, wherein the processor is configured to estimate a distance from a position at which the target image is captured to an object included in the target image, calculates an intensity of disturbance based on the estimated distance, and generates the composite image based on the calculation result.

3. The image processing algorithm evaluating apparatus according to claim 1, wherein the memory is configured to store, as training images, a reference image that is the actual image not including the disturbance and a disturbance image that is the actual image including the disturbance; and the processor is configured to generate a training composite image based on the reference image and the disturbance information, using a same process as a process by which the processor generates the composite image based on the target image and the disturbance information, and that carries out training using a generative adversarial network or a cycle generative adversarial network so as to improve a determination accuracy of authenticity of the generated training composite image with respect to the disturbance image, wherein the processor is further configured to interpret the target image based on the training result of the processor and generates the composite image.

4. The image processing algorithm evaluating apparatus according to claim 3, wherein the memory is configured to store a plurality of the disturbance images including the disturbance of a same type with different degrees, the processor is configured to carry out training based on the plurality of disturbance images including the disturbance with different degrees, and when receiving an input of the disturbance information including a degree of the disturbance, the processor interprets the target image based on the training result of the processor, and generates the composite image in such a manner that the disturbance is reflected to the target image by a degree corresponding to the disturbance information.

5. The image processing algorithm evaluating apparatus according to claim 3, wherein the memory is configured to store a plurality of the actual images including different attributes in a manner associated with label information indicating the attributes, the processor is configured to carry out training using the cycle generative adversarial network in such a manner that a determination accuracy related to the attributes between the generated training composite image and the disturbance image is improved, and when receiving the target image and the disturbance information, extract label information indicating the attribute of the target image, the processor is configured to interpret the target image based on the training result of the processor, and generates the composite image reflecting the attribute.

* * * * *